United States Patent [19]

Berger et al.

[11] Patent Number: 5,578,805
[45] Date of Patent: Nov. 26, 1996

[54] METAL-ENCLOSED GAS-FILLED SWITCHGEAR UNITS

[75] Inventors: Ernst Berger, Mellingen; Franz Heil, Baden-Rütihof, both of Switzerland

[73] Assignee: ABB Management AG, Baden, Switzerland

[21] Appl. No.: 421,259

[22] Filed: Apr. 13, 1995

[30] Foreign Application Priority Data

Jun. 13, 1994 [DE] Germany ............... 44 20 524.4

[51] Int. Cl.⁶ .................... H01H 33/70; H02B 13/035
[52] U.S. Cl. ................. 218/43; 218/57; 218/68; 218/75; 218/79; 361/605; 361/612; 361/618
[58] Field of Search ................... 361/604–621; 218/43, 44, 45, 51, 55, 57–67, 68–80, 84

[56] References Cited

U.S. PATENT DOCUMENTS

| | | | |
|---|---|---|---|
| 3,740,508 | 6/1973 | Olsen et al. | 218/67 |
| 3,889,076 | 6/1975 | Olsen et al. | 200/48 R |
| 4,700,270 | 10/1987 | Munzinger et al. | 361/612 |
| 4,745,522 | 5/1988 | Mitomo et al. | 218/44 |
| 4,774,628 | 9/1988 | Diaferia et al. | 218/75 |
| 4,965,419 | 10/1990 | Chyla et al. | 218/43 |
| 5,025,118 | 6/1991 | Meinherz et al. | 218/51 |
| 5,478,980 | 12/1995 | Freeman et al. | 218/59 |
| 5,484,972 | 1/1996 | Tecchio | 218/70 |

FOREIGN PATENT DOCUMENTS

| | | | |
|---|---|---|---|
| 1665661 | 12/1970 | Germany | H02B 5/06 |
| 2047502 | 4/1972 | Germany | H02B 13/02 |
| 2539996 | 3/1977 | Germany | H02B 13/02 |
| 3904439 | 12/1992 | Germany | H01H 33/02 |
| 4210370 | 10/1993 | Germany | H02B 13/035 |

*Primary Examiner*—J. R. Scott
*Attorney, Agent, or Firm*—Burns, Doane, Swecker & Mathis

[57] ABSTRACT

A metal-enclosed, gas-filled switchgear unit has at least two busbar systems and a circuit breaker which respectively has per pole a pole axis and at least one arcing chamber built into a pole housing constructed as a metal enclosure. The pole axes are arranged perpendicular to a foundation and lie in a first plane. Furthermore, the switchgear unit respectively has an electrically conductive connection, extending along a connecting axis, between the live arcing chamber of the respective pole and each of the busbar systems. A metal-enclosed, gas-filled switchgear unit is provided in which the insulation and the fastening of the arcing chambers of the circuit breaker poles are substantially simplified and reduced in cost. The arcing chamber is connected in a force-closed fashion to the at least two current terminals and the arcing chamber is positioned by these alone in the metal enclosure.

9 Claims, 5 Drawing Sheets

METAL-ENCLOSED GAS-FILLED SWITCHGEAR UNITS

BACKGROUND OF THE INVENTION

1. Field of the Invention

The invention relates to a metal-enclosed gas-filled switchgear unit.

2. Discussion of Background

Single-phase metal-enclosed gas-filled switchgear units are known whose circuit breaker poles have arcing chambers which are held by specially constructed support arrangements made from insulating material and are supported against the pole housing, which is constructed as a metal enclosure. Each of these support arrangements is comparatively complicated and expensive to produce. As a rule, the current terminals of these arcing chambers are likewise held in the metal enclosure by separate further supports, this type of support being used as a standard component at a multiplicity of points in the gas-filled switchgear units. This type of support can be produced in an entirely economical fashion owing to the comparatively large batch-quantities.

Furthermore, the parts of the arcing chamber which are situated on both sides of its point of interruption are connected as a rule by a pressure-resistant insulating conduit which is comparatively expensive to produce.

SUMMARY OF THE INVENTION

Accordingly, one object of this invention as defined in the independent claims is to provide a novel metal-enclosed gas-filled switchgear unit in which the insulation and the fastening of the arcing chambers of the circuit breaker poles are substantially simplified and reduced in cost.

This metal-enclosed gas-filled switchgear units has at least one busbar system having a circuit breaker which respectively has per pole one pole axis and at least one arcing chamber built into a pole housing. The circuit breaker is provided with at least two current terminals of which each is connected in a force-closed fashion by means of a separate insulator to the pole housing, which is constructed as a metal enclosure. An electrically conductive connection extending along a connecting axis connects the live arcing chamber of the respective circuit breaker pole to the respectively assigned busbar. With regard to the economy of the gas-filled switchgear units, there is a particularly favorable effect due to the fact that the arcing chamber is connected in a force-closed fashion to the at least two current terminals, and that the arcing chamber is positioned by these alone in the pole housing constructed as a metal enclosure. There is no need in the embodiment of the circuit breaker according to the invention for specially constructed support arrangements made from insulating material which hold the arcing chamber and are supported directly against the pole housing constructed as a metal enclosure.

The electrically conductive connection has a contact subassembly which is arranged in the interior of the pole housing and has a contact ring, the contact ring concentrically surrounding the pole axis of the circuit breaker. On the one hand, the contact ring is permanently connected via a connecting piece to a first current terminal penetrating a first partition insulator, and on the other hand can be plugged into a second current terminal penetrating a second partition insulator. In the interior, the contact ring contacts an exhaust housing which is connected in an electrically conductive fashion to the arcing chamber and has on the outside a collar which is supported on the contact ring. In addition, means are provided for fixing the exhaust housing in the contact ring.

A further advantageous reduction in cost of the circuit breaker results from the fact that an upper part and a lower part of the arcing chamber are held together only by an insulating nozzle upon being built into the pole housing. Owing to this simple design, the assembly of the arcing chamber becomes somewhat more expensive. However, the arcing chamber insulating conduit which is normally used and is expensive as a rule can be saved here, and this is accompanied by further economic advantages.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

In all the figures, identically operating elements are provided with identical reference symbols. All the elements not required for the direct understanding of the invention are not represented.

DESCRIPTION OF THE PREFERRED EMBODIMENTS

Figure 1:
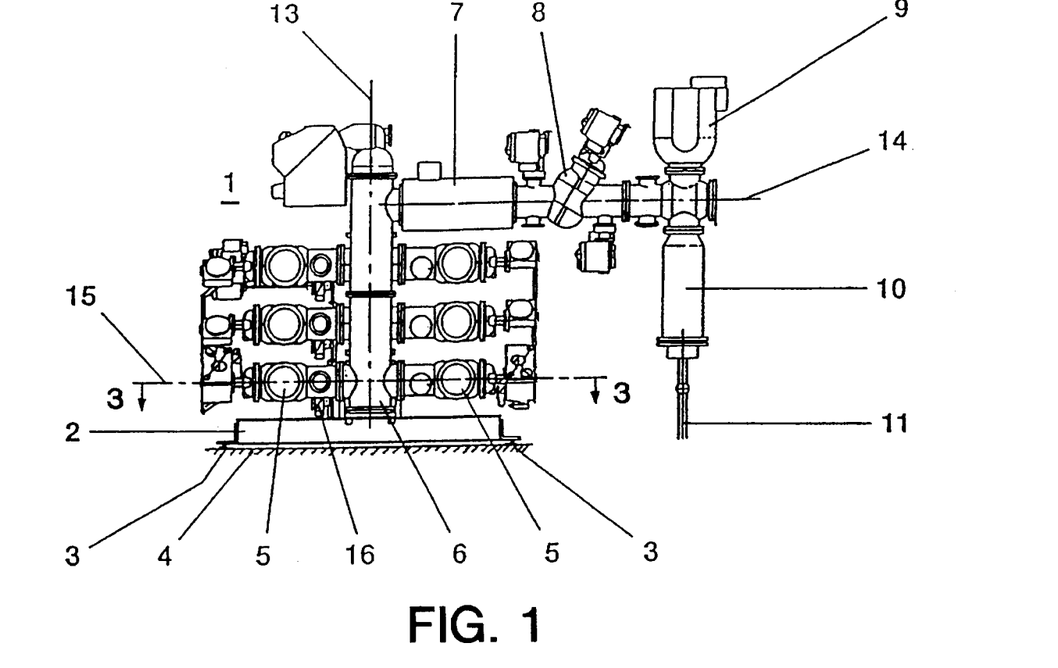
FIG. 1 shows a side view of an outgoing feeder of a gas-filled switchgear units.
Figure 2:
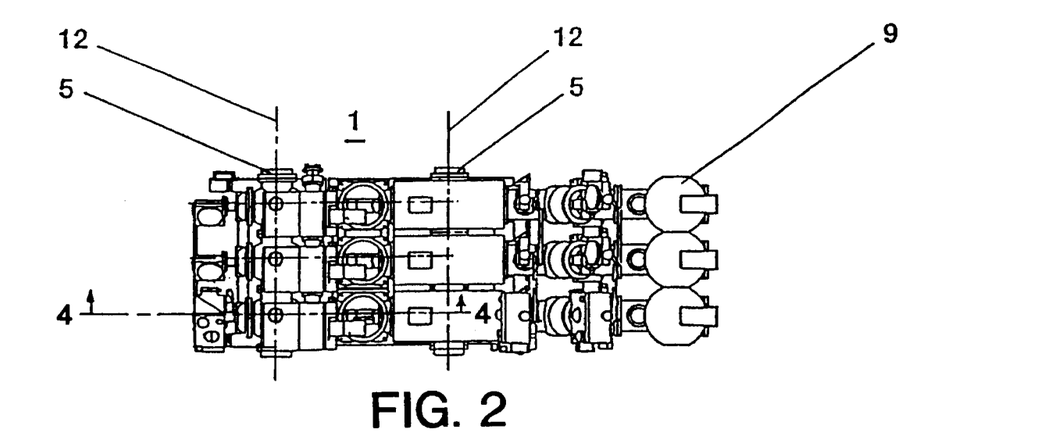
FIG. 2 shows a top view of an outgoing feeder of a gas-filled switchgear units.

Referring now to the drawings, wherein like reference numerals designate identical or corresponding parts throughout the several views, FIG. 1 shows a diagrammatically represented side view of an outgoing feeder 1 of a single-phase metal-enclosed gas-filled switchgear units, and FIG. 2 shows a top view of this outgoing feeder 1. This outgoing feeder 1 has a supporting frame 2 which is produced from a metal section. I-sections or tubular sections made from steel can be used, for example, as particularly suitable metal sections. As a rule, the tubular sections have a round or a rectangular cross section. Attached to the corners of the supporting frame 2 are angle sections 3 which serve to connect the supporting frame 2 to a foundation 4. This connection can be constructed in a force-closed fashion, but it can also permit sliding of the supporting frame 2 on a supporting rail recessed into the foundation 4 and not represented here. In this type of metal-enclosed and gas-filled switchgear units, the busbars 5 are arranged perpendicularly above one another on one or on both sides of the perpendicularly positioned poles of the circuit breaker 6. The outgoing feeder is provided with a current transformer 7, downstream of which a disconnector 8 is connected which takes over the function of the outgoing-feeder disconnector. An earth electrode is respectively provided on either side of the disconnector 8. A voltage transformer 9 is provided downstream of the disconnector 8. A cable terminal 10 connects the outgoing high-voltage cable 11 to the gas-filled switchgear units. A panel provided for an infeed is constructed in a similar way as the outgoing feeder 1 described.

The busbars 5 respectively have a busbar axis 12. The busbar axes 12 of each of the two busbar systems lie in a plane perpendicularly above one another. The poles of the circuit breaker 6 each have a pole axis 13. The pole axes 13 of the three circuit breaker poles lie in a plane which is perpendicular to the foundation 4. The planes in which the busbar systems lie and the planes in which the pole axes 13 lie are arranged parallel to one another in the case of this outgoing feeder 1. The part Of the outgoing feeder 1 leading away from the respective circuit-breaker pole, the current transformer 7, the disconnector 8 and the housing to which the cable terminal 10 is flanged extend along a longitudinal axis 14. The longitudinal axis 14 is perpendicular to the respective pole axis 13. The part of the outgoing feeder leading away from the circuit breaker 6 can extend in a direction as represented in FIG. 1, but it can also extend in the opposite direction. The upper part of the pole housing can be appropriately aligned during assembly. As a rule, a rotation by 180° about the pole axis 13 is undertaken, but it is also possible to rotate the upper part of the pole housing backwards by an angle in the range around 180°. Since the circuit breaker 6 is provided with a separate drive per pole, each of the three poles can have differently aligned outgoing feeders.

In an incoming feeder which is constructed in a fashion similar to the outgoing feeder 1, and in which the infeed extends along the respective longitudinal axis 14, for example as far as bushings which are connected to an open line, this possibility of rotating the upper part of the pole housing has a particularly advantageous effect, since it is possible in this way to realize sufficient phase spacings simply even in switchgears having restricted conditions of space for the introduction of the open line.

The connection from the respective circuit breaker pole to the busbars extends along a connecting axis 15. It may be seen from FIG. 1 that in the case of this outgoing feeder 1 equipped with a double-busbar system only one earth electrode 16 is provided per connection. In this gas-filled switchgear units, one of the two earth electrodes normally required in this region is saved without loss of safety and without reducing the availability of the gear. In the case of a switchgear units having a double-busbar system, the earth electrode 16 can optionally be installed either on one or on the other side of the circuit breaker pole.

If the switchgear units panel is constructed as a coupler panel, the space provided on one side of the circuit breaker pole for the earth electrode is sufficient to seal the pole housing in a pressure-tight fashion by means of a cover, and enough space still remains for the busbar, so that even in a coupler panel the busbar axis 12 can be retained unchanged by comparison with the incoming and outgoing feeders.

Figure 3:
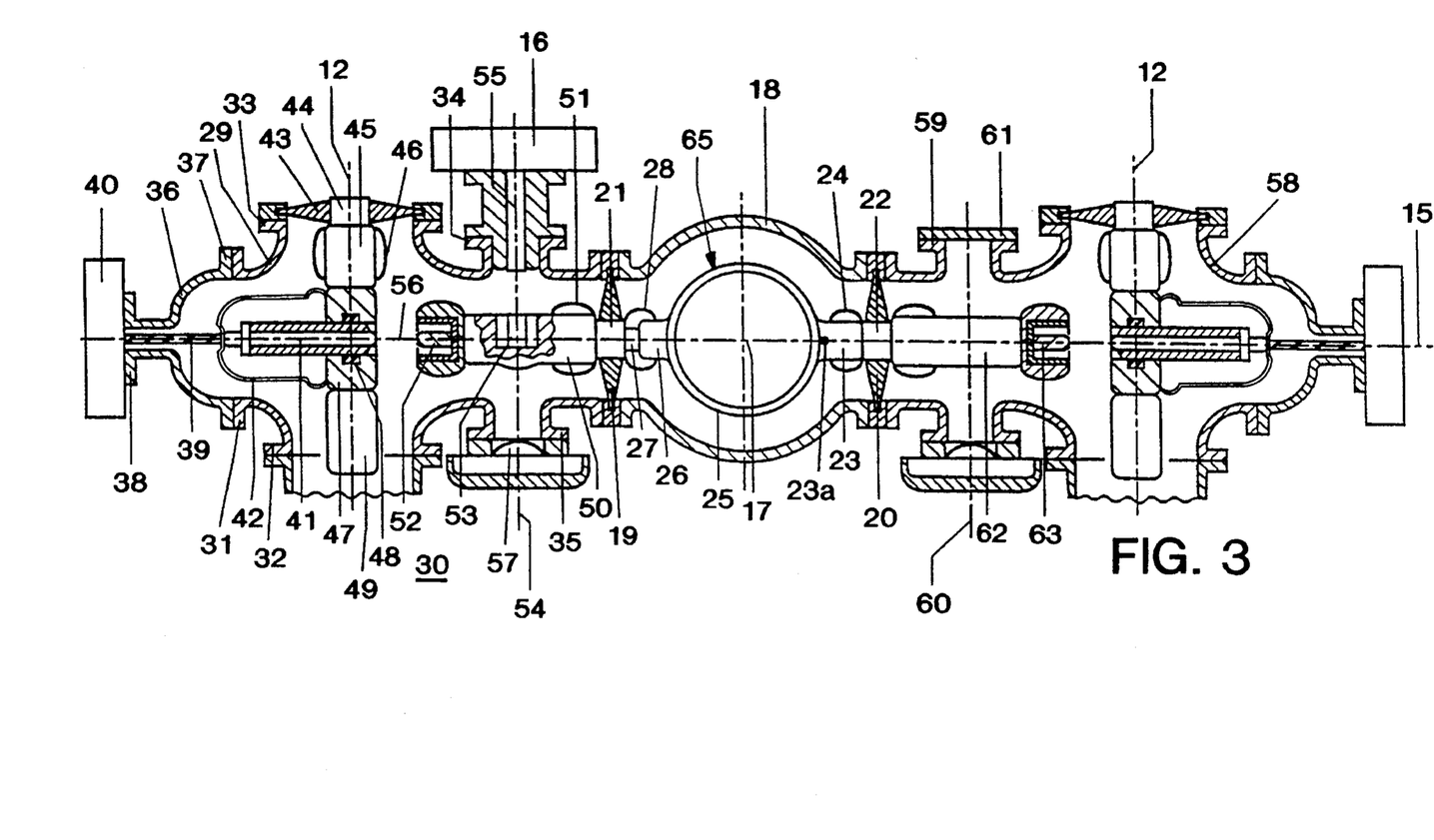
FIG. 3 shows a diagrammatic representation of the section 3—3 illustrated in FIG. 1.

FIG. 3 shows a diagrammatic representation of the section 3—3 illustrated in FIG. 1. The pole axis 13 is perpendicular to the plane of the illustrated section, through which it passes at a central point 17. A cylindrically constructed housing lower part 18, which extends along the pole axis 13, is provided with two openings (not designated) which lie on the connecting axis 15 as center and are respectively flanged in a pressure-tight fashion to a cylindrically constructed, disk-shaped partition insulator 19, 20. Of course, it is also possible in principle to use at these points other insulators, which are not designed as partition insulators. The partition insulator 19 has a current terminal 21 which penetrates it at the center. The partition insulator 20 has a current terminal 22 which penetrates it at the center. Bolted onto the current terminal 22 is an electrically conductive connecting piece 23 which is surrounded by a screen 24 which is configured in a dielectrically favorable fashion. The connecting piece 23 is permanently bolted to a contact ring 25 made from a metal which is a good conductor of electricity. The connecting piece 23 and the contact ring 25 can also be constructed in one piece. On the side opposite the connecting piece 23, the contact ring 25 has a contact arrangement 26 bolted onto it. The current terminal 21 is connected to a contact carrier 27, which is fitted, for example, with spiral contacts. The contact arrangement 26 surrounds the contact carrier 27 and forms with it a detachable plug-in contact which is surrounded by a screen 28 which is configured in a dielectrically favorable fashion.

The center of the contact ring 25 coincides with the central point 17. The cylindrically constructed inner surface of the contact ring 25 is provided with at least one groove (not represented) into which a plastic ring (not represented) is glued. Upon installation of the arcing chamber, the plastic ring guides the electrically conductive exhaust housing of said chamber, which housing is fitted on the outside with elastic contact elements, for example with spiral contacts, which produce an electric contact with the contact ring 25, and it prevents the elastic contact elements from being subjected to an asymmetrical mechanical loading. The central inner opening of the contact ring 25 accommodates the exhaust housing connected to the arcing chamber. The housing 29 of a disconnector 30 constructed as a right-angle disconnector is flanged in a pressure-tight fashion to the side of the partition insulator 19 opposite the contact carrier 27. Recessed into the connecting piece 23 is a threaded bore which is provided with a bolt 23a, which bore also penetrates the contact ring 25. The bolt 23a serves for the force-closed connection of the connecting piece 23, or of the contact ring 25 to the exhaust housing of the arcing chamber after this housing has been inserted into the contact ring 25.

The housing 29 (represented in a simplified way) of the disconnector 30 has a wall made from metal. As a rule, the housing 29 is cast in a pressure-tight fashion from an aluminum alloy. In addition to the opening closed by the partition insulator 19, the housing 29 has five further openings (not designated) which are provided with flanges 31 to 35. In addition, the housing 29 has a longitudinal axis which coincides with the connecting axis 15. Upon assembly of the disconnector, the opening provided with the flange 31 is provided with a metallic cover 36 which has a flange 37 which is bolted in a gas-tight fashion to the flange 31. A further flange 38 is attached to the cover 36 opposite the flange 37. The flange 38 serves to fasten a pressure-resistant bushing for an insulating pole 39 which during a switching operation of the disconnector 30 can be moved in the direction of an operating axis which coincides with the connecting axis 15. The insulating pole 39 moves, driven by a disconnector drive 40 likewise connected to the flange 38, the movable contact arrangement 41 (represented in a highly diagrammatic fashion) of the disconnector 30. The movable contact arrangement 41 is surrounded by a dielectrically effective screen 42 which is penetrated by the insulating pole 39.

A busbar housing (not designated) is flanged to the flange 32. Flanged to the flange 33 is a partition insulator 43 which is penetrated by a current terminal 44. Bolted to the current terminal 44 is a conductor piece 45 which is covered on the insulator side by a dielectrically effective screen 46. The conductor piece 45 extends along the busbar axis 12, which extends perpendicular to the connecting axis 15. The conductor piece 45 is connected in an electrically conductive fashion to a first fixed contact carrier 47 of the disconnector 30. Recessed into the contact carrier 47 is a sliding contact 48 which is provided for the current transfer from the movable contact arrangement 41 of the disconnector 30 to the contact carrier 47. The sliding contact 48 is arranged concentrically with the connecting axis 15, and it is provided with contact fingers, with contact laminations or with spiral contacts. The contact carrier 47 is arranged concentrically with the connecting axis 15. The contact carrier 47 is constructed at the same time as a part of the active busbar parts. Attached to the side of the contact carrier 47 opposite the conductor piece 45 is a further conductor piece 49, which extends along the busbar axis 12 through the opening provided with the flange 32. The current terminal 21 is connected in an electrically conductive fashion to a second fixed contact carrier 50 of the disconnector 30. The end of the contact carrier 50 on the insulator side is covered by a dielectrically effective screen 51. The end of the contact carrier 50 facing the contact carrier 47 is provided with a mating contact 52, arranged concentrically with the connecting axis 15, for the movable contact arrangement 41 of the disconnector 30. The contact carriers 47 and 50 are shaped in a dielectrically favorable fashion, and any edges are designed in a rounded-off fashion. During operation, the current terminals 44 and 21 are at a high-voltage potential and are insulated with respect to the metal enclosure of the gas-filled switchgear units.

In addition, there is recessed into the contact carrier 50 a mating contact 53 which is constructed in a tulip-shaped fashion, is arranged concentrically with an installation axis 54 and accommodates the contact pin 55 of the earth electrode 16 when the earth electrode 16 is closed. The installation axis 54 is perpendicular to the connecting axis 15. When the disconnector 30 is open, there is a spacing 56 between the contact carrier 47 and the mating contact 52. This spacing 56 corresponds to the isolating distance of the disconnector 30, which distance during operation withstands all the operationally induced voltage stresses occurring at this point.

Upon switching on the disconnector 30, the movable contact arrangement 41 is moved by the insulating pole 39 operated by the disconnector drive 40 along the connecting axis 15 onto the mating contact 52. A pre-arcing between the movable contact arrangement 41 and the mating contact 52, possibly caused by residual charges and/or by a voltage of operating frequency present between the contact carrier 47 and the mating contact 52, is satisfactorily mastered by the disconnector 30. A widening of the pre-arcing arc towards the wall of the housing 29 cannot occur, because of the geometrical arrangement of the contact carrier 47 and of the mating contact 52. The disconnector drive 40 is designed in such a way that it moves the movable contact arrangement 41 reliably into the envisaged closed position in any possible case of operation, with the result- that a satisfactory conduction of current is guaranteed via the nominal current contacts (not described in more detail) provided therefor. The opening of the disconnector 30 is likewise also always performed satisfactorily.

The earth electrode 16 is built here into the opening provided with the flange 34. However, it could also alternatively be built into the opening provided with the flange 35. It is possible to flange in a pressure-tight fashion to the flange 35 detectors for monitoring the gas-filled switchgear units, for example, or, as shown in FIG. 3, a bursting disk 57 which in the event of a fault enables pressure relief of the housing 29. The two flanges 34 and 35 have a common installation axis 54.

The housing 58 flanged onto the other side of the housing lower part 18 corresponds with virtually all built-in components to the housing 29; it is only arranged in mirror image fashion with respect to the latter, and no earth electrode is built in. The opening provided with a flange 59, into which opening an earth electrode extending along an installation axis 60 could be built, is sealed in a pressure-tight fashion by means of a cover 61. The mating contact of the earth electrode is likewise also not built in. Connected in an electrically conductive fashion to the current terminal 22 on the side averted from the connecting piece 23 is a contact carrier 62 which carries a mating contact 63 of the disconnector arranged on the right. The installation of a second earth electrode is not required here, since by virtue of the electrically conductive contact ring 25 the mating contact 63 and the contact carrier 62 are always at the same potential as the contact carrier 50 and the mating contact 52, with the result that it is completely sufficient when these active parts are reliably earthed in common with the aid of the single earth electrode 16, when required.

The disconnector 30 can be built in in any mounting position which is prescribed by the system concept of the metal-enclosed gas-filled switchgear units. The earth electrode 16 can likewise be operated independently of position, with the result that there are again no installation limitations because of this. The earth electrode 16 can be constructed both as a work-in-progress earthing switch and as a make-proof earthing switch. The subassembly composed of disconnector 30 and upstream earth electrode 16 is of very compact design and takes up particularly little space in the direction of the connecting axis 15, with the result that the switchgear units panel can be designed with particularly small dimensions.

The open isolating distance of the disconnector is insulated in the most highly reliable fashion by means of $SF_6$. In the closed state, the disconnector has an optimum nominal current-carrying capacity and a very good short-circuit current-carrying capacity and surge strength. Furthermore, it has a reliable switching capacity in the case of small capacitive currents, and in addition controls the switchover in the case of an uninterrupted busbar change.

The disconnector 30 has separate contact systems for continuous current conduction and for the actual switching operation. The continuous current contacts are of simple and reliable construction, and they have a minimal number of individual parts. The contact movement is performed by means of an electrically driven disconnector drive which is arranged outside the disconnector housing filled with $SF_6$ gas, but the disconnector can also be driven by hand. Such a configuration facilitates the maintenance work very advantageously. The disconnector 30 is provided with a mechanically coupled position indicator, and it is possible, furthermore, to provide an inspection window for an endoscope for monitoring the position of the contacts of the disconnector 30.

Figure 4:
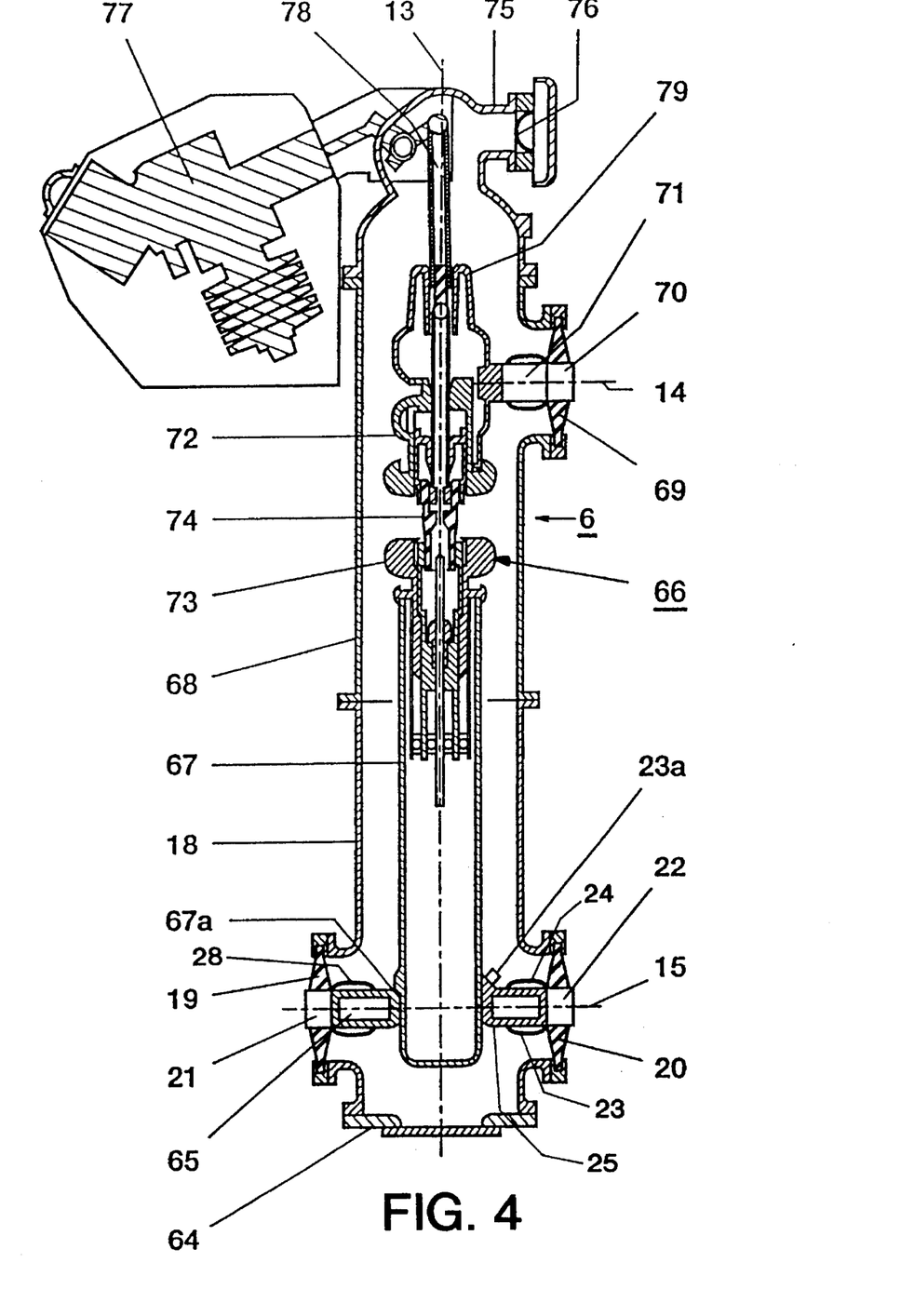
FIG. 4 shows a diagrammatic representation of the section 4—4 illustrated in FIG. 2.

FIG. 4 shows a greatly simplified diagrammatic representation of the section 4—4, illustrated in FIG. 2, through a first pole of the circuit breaker 6. This pole has a metallic pole housing, filled with insulating gas, which is composed of a plurality of components which are connected to one another in a pressure-tight fashion. The pole housing has a housing lower part 18 which is sealed at the bottom by a cover flange 64 and which is of the same construction in all three poles of a three-pole circuit breaker 6, but which is used in a different mounting position. A contact subassembly 65 is respectively built into the housing lower part 18. This contact subassembly 65 consists in each case of the parts described in conjunction with FIG. 3, such as the connecting piece 23 with the screen 24, the contact ring 25, the contact arrangement 26 and the contact carrier 27 with the screen 28. The contact subassembly 65 is on the one hand pluggably connected to the current terminal 21 of the partition insulator 19, and, on the other hand, permanently connected to the current terminal 22 of the partition insulator 20. The circuit breaker pole has an arcing chamber 66 which has a cylindrically constructed exhaust housing 67 which is produced from metal, arranged concentrically with the pole axis 13 and is driven into the contact subassembly 65 and connected in an electrically conductive fashion to the latter via sliding contacts such as, for example, spiral contacts. The exhaust housing 67 transmits the potential of the contact subassembly 65 onto the lower part of the arcing chamber 66 and simultaneously conducts the operating current when the circuit breaker pole is closed. In the region above the contact subassembly 65, the exhaust housing 67 has a collar 67a by means of which it is supported on the contact ring 25 of the contact subassembly 65. In order to ensure a defined current transfer via the sliding contacts, the collar 67a or the contact ring 25 is provided at the support point with an insulating coating which prevents current transfer at this point. The contact subassembly 65 bears a part of the weight of the arcing chamber 66 and additionally absorbs the reaction forces caused by the moved contacts of the arcing chamber 66.

Mounted in a pressure-tight fashion on the housing lower part 18 is a housing upper part 68 which has an opening (not designated) sealed in a pressuretight fashion by a partition insulator 69. The partition insulator 69 has a current terminal 70 which penetrates it and which on the one hand is connected in an electrically conductive fashion to the active parts (not represented), extending in the direction of the longitudinal axis 14, of the outgoing feeder and, on the other hand, is permanently connected via a contact piece 71 to the upper part 72 of the arcing chamber 66; as a rule, a bolted joint is provided here. The upper part 72 and the lower part 73 of the arcing chamber 66 are connected to form a unit by an insulating nozzle 74. When the circuit breaker pole is disconnected, the insulating nozzle 74 insulates the upper part 72 from the lower part 73. There is no need here for an additional connection between the upper part 72 and the lower part 73 by means of an insulating conduit. The saving of this insulating conduit is attended by economic advantages. The arcing chamber 66 is held at the center of the pole housing only by the bolted joint with the contact piece 71 and by the contact subassembly 65. A housing cover 75 is connected to the housing upper part 68 and seals the pole housing at the top. The housing cover 75 is provided with a bursting disk 76 which in an emergency allows an overpressure produced in the pole housing to escape into the environment. A drive 77 for the circuit breaker pole is flanged to the housing cover 75. The drive 77 is not seated on the pole axis 13; it is arranged next to the pole housing, specifically here on the side of the pole housing opposite the outgoing feeder to the cable terminal 10. The overall height of the circuit breaker pole is therefore not increased, or increased only insignificantly, by the drive 77. The drive 77 acts via a diagrammatically indicated power transmission on an insulating operating rod 78 which moves the movable contact parts of the arcing chamber 66 along the pole axis 13.

Integrally formed on the upper part 72 of the arcing chamber 66 is a guide part 79 which guides the insulating operating rod 78 along the pole axis 13.

During assembly, the arcing chamber 66 is inserted as a whole from above along the pole axis 13 into the pole housing in such a way that the exhaust housing 67 makes satisfactory contact with the contact subassembly 65, and that after it has been bolted the contact piece 71 likewise reliably connects the active parts of the outgoing feeder electrically to the upper part 72 of the arcing chamber 66. Finally, the bolt 23a is then tightened in addition, with the result that the arcing chamber 66 is fixed at two points. Other positions of the pole axis 13 are also conceivable, in particular also the horizontal position in the case of appropriately constructed gas-filled switchgear units.

Figure 5:
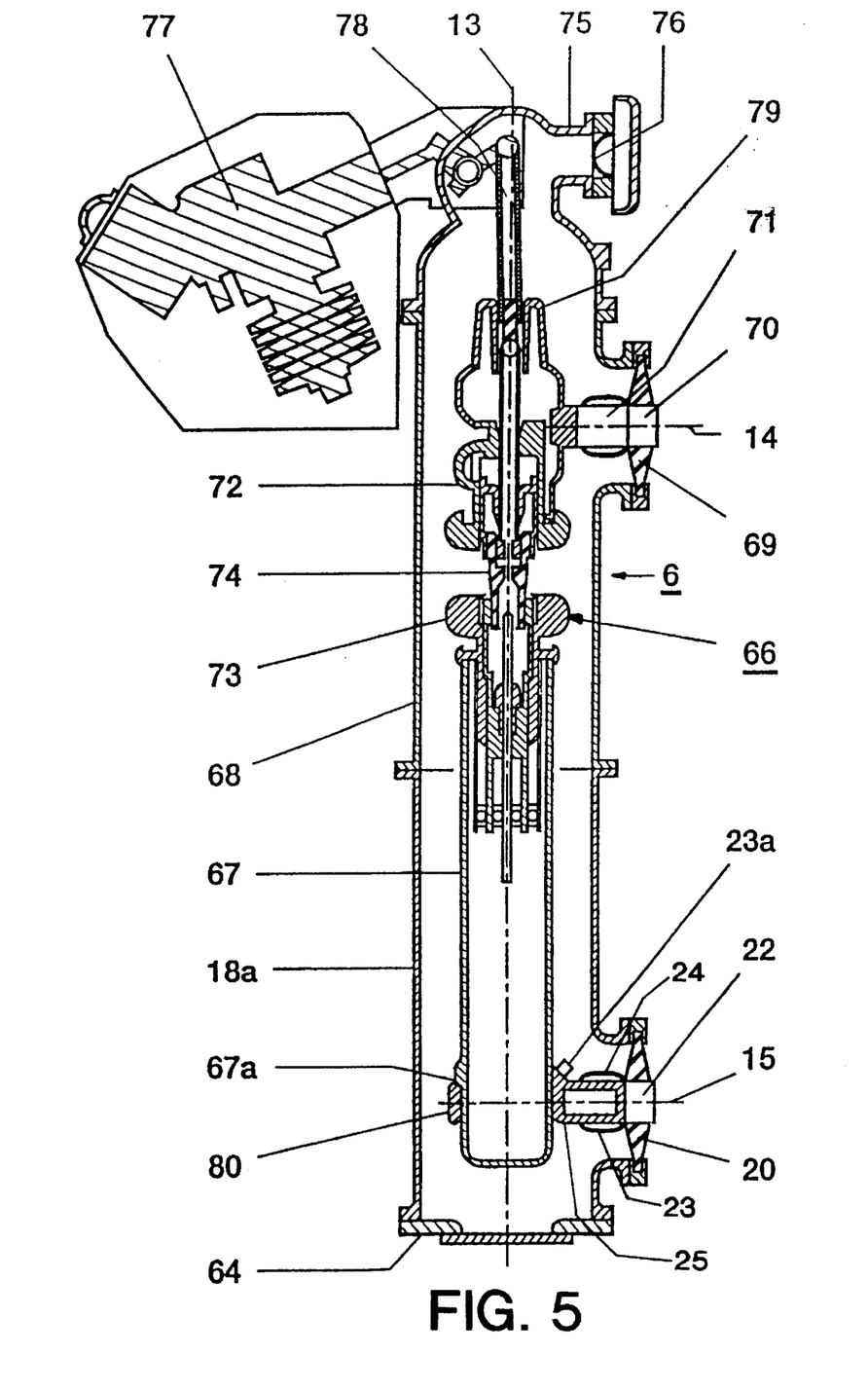
FIG. 5 shows a diagrammatic representation of an embodiment of the invention having an outgoing feeder with a single bus-bar system.

FIG. 5 shows a section through a pole of a circuit breaker 6 which is constructed in a fashion similar to that shown in FIG. 4, but in this circuit breaker 6 the installation of the left-hand busbar system is not provided for, and this leads to a particularly economic configuration of the outgoing feeder. The contact subassembly 80 is of somewhat simpler configuration in this design, since it is necessary to connect only one busbar system to the exhaust housing 67. Furthermore, the housing lower part 18a has no opening for contact with a second busbar system. The remaining components of this circuit breaker 6 are constructed identically to the parts already described in conjunction with FIG. 4. There is no need here, either, for the upper part 72 of the arcing chamber 66 to be additionally connected to the lower part 73 by means of an insulating conduit. The saving of this insulating conduit is attended by economic advantages. The arcing chamber 66 is held at the center of the pole housing only by the bolted joint with the contact piece 71 and by the modified contact subassembly 80.

Figure 6:
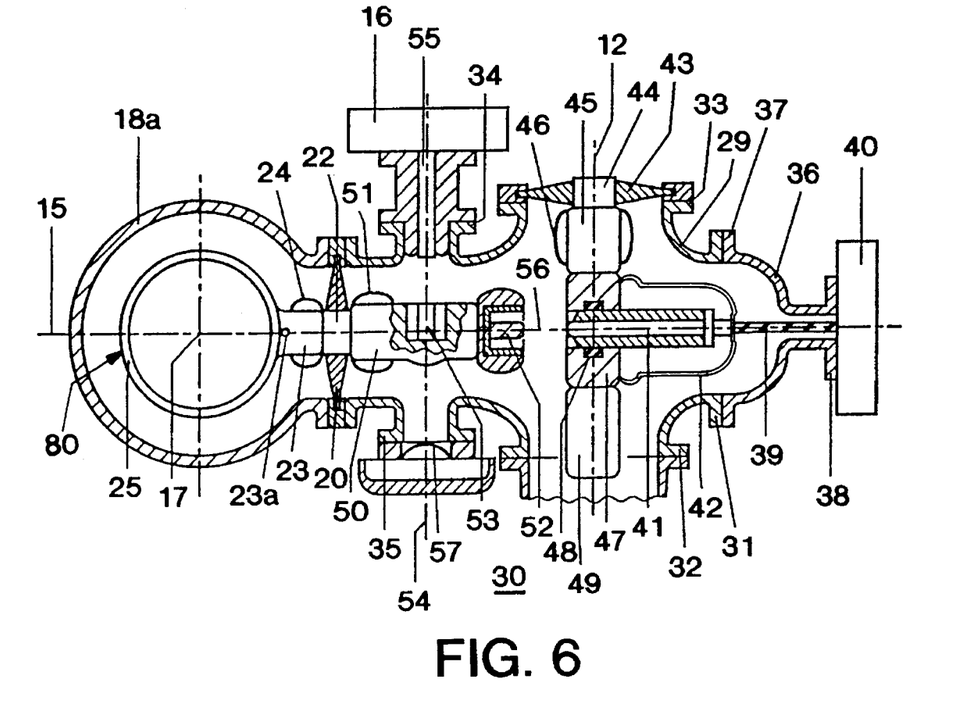
FIG. 6 is a partial diagrammatic representation of the outgoing feeder of FIG. 5 and corresponds to the lower half of the sectional view illustrated in FIG. 3.

FIG. 6 is a partial diagrammatic representation of the outgoing feeder of FIG. 5 and corresponds to the lower half of the sectional view illustrated in FIG. 3. Since only the right-hand busbar system is contacted here, the housing lower part 18a has only one possibility of contact. The earth electrode 16 is arranged between the circuit breaker 6 and the disconnector 30. The structure of the disconnector 30, which is designed as a right-angle disconnector, has already been described in conjunction with the variant embodiment represented in FIG. 3. Here, too, a threaded bore which is provided with a bolt 23a and also penetrates the contact ring 25 is recessed into the connecting piece 23. The bolt 23a serves to connect the connecting piece 23, and the contact ring 25, respectively, in a forceclosed fashion to the exhaust housing of the arcing chamber after the latter has been inserted into the contact ring 25.

In the metal-enclosed gas-filled switchgear units according to the invention, the pole axes 13 are arranged in one plane. The pole axes 13 run in this case perpendicular to the foundation 4. The busbar axes 12 of a busbar system are likewise arranged in one plane perpendicular to the foundation 4, but the busbar axes 12 run parallel to the surface of the foundation 4. If a gas-filled switchgear unit is produced with only one busbar system, as is possible with the circuit breaker design in accordance with FIG. 5, said system can optionally be arranged on one or on the other side of the plane of the pole axes 13 of the circuit breaker 6 when the housing lower part 18a is rotated correspondingly by 180° about the pole axis 13. For special applications, it is also possible to guide only one of the busbars of the system on the opposite side of the plane of the pole axes 13. If the gas-filled switchgear units is equipped with a double-busbar system, the busbar systems are arranged as a rule on both sides of the plane of the pole axes 13 of the circuit breaker 6 and at the same distance therefrom. Owing to this assignment of the busbars 5 in planes parallel to the pole axes 13 of the circuit breaker 6, a particularly space-saving arrangement of the busbar terminals is possible, and they can be arranged on a diagonal.

A particularly compact arrangement of the gas-filled switchgear units is produced when the distance between adjacent busbar axes 12 is selected to be of precisely the same size as the distance between adjacent pole axes 13.

Obviously, numerous modifications and variations of the present invention are possible in light of the above teachings. It is therefore to be understood that within the scope of the appended claims, the invention may be practiced otherwise than as specifically described herein.

What is claimed is:

1. A metal-enclosed, gas-filled switchgear unit including at least one busbar system, comprising:

a circuit breaker pole housing, the pole housing being in the form of a metallic enclosure and having a pole axis;

at least one upper current terminal and at least one lower current terminal, the upper current terminal and the lower current terminal each being connected to the pole housing by separate insulators, the upper current terminal and the lower current terminal having an upper electrically conductive connection arrangement and a lower electrically conductive connection arrangement, respectively;

an arcing chamber extending along the pole axis in the pole housing and in a breakable electrical path between the upper current terminal and the lower current terminal; and the lower connection arrangement including a contact subassembly having an electrically conductive contact ring electrically connected to at least part of the arcing chamber, the contact subassembly being arranged in the interior of the pole housing and the contact ring being concentric with the pole axis.

2. The metal-enclosed, gas-filled switchgear unit as set forth in claim 1, comprising a first lower current terminal and a second lower current terminal, the first lower current terminal and the second lower current terminal penetrating first and second insulators, respectively, and being connected to the pole housing by the first and second insulators, the contact ring including a connecting piece permanently connecting the contact ring to the first lower current terminal, and means for removably connecting the contact ring to the second lower current terminal.

3. The metal-enclosed, gas-filled switchgear unit as set forth in claim 2, further comprising, in the pole housing, an exhaust housing, the exhaust housing being electrically connected to the arcing chamber, the contact ring contacting the exhaust housing.

4. The metal-enclosed, gas-filled switchgear unit as set forth in claim 3, wherein the exhaust housing includes a collar on an outside of the exhaust housing, the collar being supported on the contact ring.

5. The metal-enclosed, gas-filled switchgear unit as set forth in claim 4, further comprising means for fixing the exhaust housing in the contact ring.

6. The metal-enclosed, gas-filled switchgear unit as set forth in claim 4, further comprising means for electrically insulating the collar from the contact ring.

7. The metal-enclosed, gas-filled switchgear unit as set forth in claim 1, wherein the arcing chamber includes an upper part and the upper current terminal includes a contact piece, the contact piece being electrically connected to the upper part of the arcing chamber by a force-fit connection.

8. The metal-enclosed, gas-filled switchgear unit as set forth in claim 1, wherein the metal-enclosed, gas-filled switchgear unit is disposed on a foundation, the pole axis being arranged perpendicular to the foundation, and wherein the arcing chamber is movable into and out of the pole housing along the pole axis.

9. The metal-enclosed, gas-filled switchgear unit as set forth in claim 1, wherein the arcing chamber includes an upper part, a lower part, and an insulating nozzle, the upper part and the lower part of the arcing chamber being held together by the insulating nozzle.

* * * * *